United States Patent [19]

Strandjord

[11] Patent Number: 5,734,469
[45] Date of Patent: Mar. 31, 1998

[54] PROPER FREQUENCY TRACKER FOR FIBER OPTIC SENSING COIL

[76] Inventor: Lee K. Strandjord, 8162 E Via De La Escuela, Scottsdale, Ariz. 85258

[21] Appl. No.: 816,461

[22] Filed: Mar. 13, 1997

Related U.S. Application Data

[63] Continuation of Ser. No. 476,920, Jun. 7, 1995, abandoned.
[51] Int. Cl.$^6$ .................................................. G01C 19/72
[52] U.S. Cl. .................................................. 356/350
[58] Field of Search .................................. 356/350, 345; 385/12, 14; 250/227.19, 227.27

[56] References Cited

U.S. PATENT DOCUMENTS

| | | | |
|---|---|---|---|
| 4,759,629 | 7/1988 | Everest et al. | 356/350 |
| 4,883,358 | 11/1989 | Okada | 356/350 |
| 5,090,809 | 2/1992 | Ferrar | 356/350 |
| 5,131,750 | 7/1992 | Gravel et al. | 356/350 |
| 5,285,257 | 2/1994 | Negishi et al. | 356/350 |
| 5,311,281 | 5/1994 | Rochereau et al. | 356/350 |

Primary Examiner—Samuel A. Turner
Attorney, Agent, or Firm—John G. Shudy, Jr.

[57] ABSTRACT

A device for providing a bias modulation at a proper frequency to the counterpropagating light waves in the sensing coil of an interferometric fiber optic gyroscope. The photodetector detects the light which has exited the sensing loop, and converts it to an electrical signal that is demodulated by two phase sensitive detector. One phase sensitive detector demodulates the signal that is in phase with the bias modulation signal and the other phase sensitive detector demodulates the quadrature signal with respect to the modulation signal, and controls the frequency of the bias phase modulator driver so as to reduce the quadrature to a minimum and to keep the modulator frequency at the proper frequency of the sensing coil. Increased intensity modulation can be attained with a DC voltage applied to an electrode of the modulator to produce the quadrature signal. In the digital implementation, higher harmonics are introduced to the modulator to increase the quadrature signal for improved sensitivity of the proper frequency of the sensing coil.

11 Claims, 6 Drawing Sheets

PROPER FREQUENCY TRACKER FOR FIBER OPTIC SENSING COIL

This application is continuation of application Ser. No. 08/476,920, filed Jun. 7, 1995, now abandoned.

The present invention pertains to fiber optic gyroscopes and particularly to bias modulation of light signals in the sensing loop. More particularly, the invention pertains to determining the eigen frequency of the sensing loop.

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

A fiber optic gyroscope has a coiled optical fiber wound on a core and about the axis thereof around which rotation is to be sensed. The optical fiber is typical of a length of 100 to 2,000 meters, or so, and is part of a closed optical path in which an electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyro (IFOG). The use of a coiled optical fiber is desirable because the amount of phase difference shift due to rotation, and so the output signal, depends on the length of the entire optical path through the coil traversed by the two electromagnetic waves traveling in opposed direction, and so a large phase difference can be obtained in the long optical fiber but in the relatively small volume taken by it as a result of being coiled.

The output current from the photodetector system photodiode, in response to the opposite direction traveling electromagnetic waves impinging thereon after passing through the coiled optical fiber, follows a raised cosine function. That is, the output current depends on the cosine of the phase difference between these two waves. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator, or what is sometimes referred to as a bias modulator, in the optical path on one side of the coiled optical fiber. In order to achieve sensitive detection of rotation, the Sagnac interferometer is typically biased by a sinusoidal or square wave modulation of the differential phase between the counter-propagating beams within the interferometric loop. As a result, one of these opposite direction propagating waves passes through the modulator on the way into the coil while the other wave, traversing the coil in the opposite direction, passes through the modulator upon exiting the coil.

In addition, a phase-sensitive detector serving as part of a demodulator system is provided to receive a signal representing the photodetector output current. Both the phase modulator and the phase-sensitive detector can be operated by a signal generator at the so-called "proper" frequency to reduce or eliminate modulator induced amplitude modulation, but other waveform types of the same fundamental frequency can be used. Other frequencies can be used, and often are, to reduce the frequency to a more manageable value.

The resulting signal output of the phase-sensitive detector follows a sine function, i.e., the output signal depends on the sine of the phase difference between the two electromagnetic waves impinging on the photodiode, primarily the phase shift due to rotation about the axis of the coil in the absence of occurrence of other significant but unwanted phase shifts. A sine function is an odd function having its maximum rate of change at zero phase shift, and so changes algebraic sine on either side of zero phase shift. Hence, the phase-sensitive detector signal can provide an indication of which direction a rotation is occurring about the axis of the coil, and can provide the maximum rate of change of signal value as a function of the rotation rate near a zero rotation rate, i.e. the detector has its maximum sensitivity for phase shifts near zero so that its output signal is quite sensitive to low rotation rates. This is possible, of course, only if phase shifts due to other sources, that is, errors, are sufficiently small. In addition, this output signal in these circumstances is very close to being linear at relatively low rotation rates. Such characteristics for the output signal of the phase-sensitive detector are a substantial improvement over the characteristics of the output current of the photodetector without optical phase modulation.

An example of such a system from the prior art is shown in FIG. 1. The optical portion of the system contains several features along the optical paths to assure that this system is reciprocal, i.e., that substantially identical optical paths occur for each of the opposite direction propagating electromagnetic waves except for the specific introductions of non-reciprocal phase difference shifts, as will be described below. The coiled optical fiber forms a coil 10 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e., the slower propagation axis, or the low index axis is chosen for propagating the electromagnetic waves depending on the other optical components in the system.

The electromagnetic waves which propagate in opposite directions through coil 10 are provided from an electromagnetic wave source, or light source 11, in FIG. 1. This source is typically a semiconductor light source such as a laser diode which provides electromagnetic waves, typically in the near-infrared part of the spectrum, with typical wavelengths of 830 nanometers (nm) to 1550 nm. Source 11 must have a short coherence length for emitted light to reduce the phase shift difference errors between these waves due to Rayleigh and Fresnel scattering at scattering sites in coil 10. Because of the nonlinear Kerr effect in coil 10, different intensities in the two counter propagating waves can lead to different phase shifts therebetween. This situation can be overcome also by use of a short coherence length source for source 11 that emits light with suitable statistical properties.

Between laser diode 11 and fiber optic coil 10 there is shown an optical path arrangement in FIG. 1 formed by the extension of the ends of the optical fiber forming coil 10 to some optical coupling components which separate the overall optical path into several optical path portions. A portion of optical fiber is positioned against laser diode 11 at a point of optimum light emission therefrom, a point from which it extends to a first optical directional coupler 12.

Optical directional coupler 12 has light transmission media therein which extend between four ports, two on each end of that media, and which are shown on each end of coupler 12 in FIG. 1. One of these ports has the optical fiber extending from laser diode 11 positioned thereagainst. At the other port on the sense end of the optical directional coupler 12 there is shown a further optical fiber positioned thereagainst which extends to be positioned against a photodiode 13 which is electrically connected to a photodetection system 14.

Photodiode 13 detects electromagnetic waves, or light waves, impinging thereon from the portion of the optical fiber positioned thereagainst and provides a photo current in response to a signal component selection means 35. This photocurrent, as indicated above, in the case of two nearly coherent light waves impinging thereon, follows a cosine function in providing a photocurrent output which depends on the cosine of the phase difference between such a pair of substantially coherent light waves. This photovoltaic device will operate into a very low impedance to provide the photo current which is a linear function of the impinging radiation, and may typically be a p-i-n photodiode.

Optical directional coupler 12 has another optical fiber against a port at the other end thereof which extends to a polarizer 15. At the other port on that same side of coupler 12 there is a non-reflective termination arrangement 16, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no such waves or light is transmitted to the port which is on the same end of coupler 12 as is the incoming light port.

Polarizer 15 is used because, even in a single spatial mode fiber, light can propagate in two polarization modes through the fiber. Thus, polarizer 15 is provided for the purpose of passing light propagating of one polarization, such that clockwise (cw) and counterclockwise (ccw) waves of the same polarization are introduced into the sensing loop and only light from the sensing loop of the same polarization for the cw and ccw waves are interfered at the detector. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Polarizer 15 has a port on either end thereof with the electromagnetic wave transmission medium contained therein positioned therebetween. Positioned against the port on the end thereof opposite that connected to optical directional coupler 12 is another optical fiber portion which extends to a further optical bidirectional coupler 17 which has the same wave transmission properties as does coupler 12.

The port on the same end of coupler 17 from which a port is coupled to polarizer 15 again is connected to a non-reflective termination arrangement 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber 10. Between coil 10 and coupler 17, on the side of coil 10 opposite the directly connected side thereof, is provided an optical phase modulator 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in electromagnetic waves transmitted therethrough by changing the index of refraction of the transmission medium, or transmission media, therein to thereby change the optical path length. Such electrical signals are supplied to modulator 19 by a bias modulation signal generator 20 providing a sinusoidal or square wave voltage output signal at a modulation frequency $f_g$ that is intended to be equal to $C_1\sin(\omega_g t)$ where $\omega_g$ is the radian frequency equivalent of the modulation frequency $f_g$. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source through the optical fiber portion to optical directional coupler 12. Some of such wave entering coupler 12 from source 11 is lost in non-reflecting terminating arrangement 16 coupled to a port on the opposite end thereof, but the rest of that wave is transmitted through polarizer 15 to optical directional coupler 17.

Coupler 17 serves as a beam-splitting apparatus in which electromagnetic waves entering the port thereof, received from polarizer 15, split approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning wave is lost in non-reflective arrangement 18 connected to the other port on the polarizer 15 connection end of coupler 17, but the rest of that wave passes through the other port of couple 17 to polarizer 15 and to coupler 12 where a portion of it is transmitted to photodiode 13. The other part of the wave passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photocurrent $i_{PD13}$ proportional to the intensity of the two electromagnetic waves or light waves impinging thereon, and is therefore expected to follow the cosine of the phase difference between these two waves impinging on that diode as given by the following equation:

$$i_{PD_{13}} = \beta \frac{I_0}{2} [1 + \cos(\phi_R + \phi_m \cos\omega_g t)]$$

This is because the current depends on the resulting optical intensity of the two substantially coherent waves incident on photodiode 13, an intensity which will vary from a peak value of $I_o$ to a smaller value depending on how much constructive or destructive interference occurs between the two waves. $\beta$ is the photodetector responsivity. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with an amplitude value of $\phi_m$ and which is intended to vary as $\cos(\omega_g t)$.

Optical phase modulator 19 is of the kind described above and is used in conjunction with a phase-sensitive detector as part of a demodulation system for converting the output signal of photodetection system 14, following a cosine function as indicated above, to a signal following a sine function. Following such a sine function provides in that output signal, as indicated above, information both as to the rate of rotation and the direction of that rotation about the axis of coil 10.

Thus, the output signal from photodetection system 14, including photodiode 13, is converted to a voltage and provided through an amplifier 21, where it is amplified and passed through a filter 22, to such a phase sensitive detector means 23. Photodetection system 14, amplifier 21, filter 22 and phase sensitive detector 23 constitute signal component selection means. Phase-sensitive detector 23, serving as part of a phase demodulation system, is a well known device. Such a phase-sensitive detector extracts the amplitude of the first harmonic of the filtered photodiode system output signal, or the fundamental frequency of modulation signal generator 20, to provide an indication of the relative phase of the electromagnetic waves impinging on photodiode 13. This information is provided by phase-sensitive detector 23 in an output signal following a sine function, that is, this output signal follows the sine of the phase difference between the two electromagnetic waves impinging on photodiode 13.

Bias modulator signal generator 20, in modulating the light in the optical path at the frequency $f_g$ described above, also leads to harmonic components being generated by the recombined electromagnetic waves in photodetection system 14. Filter 22 is a bandpass filter which is to pass the modulation frequency component of the output signal of photodetector 14, i.e., the first harmonic, after its amplification by amplifier 21.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves. The amplitude scaling factor of the modulation frequency component of the output signal of photodetection system 14, appearing at the output of filter 22, is expected to be set by the sine of this phase difference modified further only by the factors of a) the amplitude value of the phase modulation of these waves due to modulator 19 and generator 20, and b) a constant representing the various gains through the system. Then, the periodic effects of this sinusoidal modulation due to generator 20 and modulator 19 in this signal component are expected to be removed by demodulation in the system containing phase-sensitive detector 23 leaving a demodulator system (detector) output signal depending on just the amplitude scaling factor thereof.

Thus, the voltage at the output of amplifier 21 will typically appear as:

$$V_{21\text{-}out} = k\{1 + \cos[\phi_R + \phi_m \cos(\omega_g t + \theta)]\}$$

The constant k represents the gains through the system to the output of amplifier 21. The symbol $\theta$ represents additional phase delay in the output signal of amplifier 21 with respect to the phase of the signal provided by generator 20. Some of this phase shift will be introduced in photodetection system 14, and some will be due from other sources such as a phase shift across modulator 19 between the phase of the signals supplied by generator 20 and the response of modulator 19 in having the index of refraction of the media therein, and/or its length, correspondingly change. The other symbols used in the preceding equation have the same meaning as they did in the first equation above.

The foregoing equation can be expanded in a Bessel series expansion to give the following:

$$\begin{aligned}V_{21\text{-}out} = & \; k[1 + J_0(\phi_m)\cos\phi_R] - \\ & 2kJ_1(\phi_m)\sin\phi_R\cos(\omega_g t + \theta) - \\ & 2kJ_2(\phi_m)\cos\phi_R\cos 2(\omega_g t + \theta) + \\ & 2kJ_3(\phi_m)\sin\phi_R\cos 3(\omega_g t + \theta) + \\ & \sum_{n=2}^{\infty} [(-1)^n 2kJ_{2n}(\phi_m)\cos\phi_R\cos 2n(\omega t + \theta) + \\ & (-1)^n 2kJ_{2n+1}(\phi_m)\sin\phi_R\cos(2n + 1)(\omega_g t + \theta)]\end{aligned}$$

This signal at the output of amplifier 21 is applied to the input of filter 22.

Filter 22, as indicated above, passes primarily the first harmonic from the last equation, i.e., the modulation frequency component. As a result, the output signal of filter 22 can be written as follows:

$$V_{22\text{-}out} = -2kJ_1(\phi_m)\sin\phi_R\cos(\omega_g t + \theta + \psi_1)$$

The further phase delay term appearing $\psi_1$ is the additional phase shift in the first harmonic term added as a result of passing through filter 22. This added phase shift is expected to be substantially constant and a known characteristic of filter 22.

The signal from filter 22 is then applied to phase-sensitive detector 23, as is the signal from bias modulator generator 20, the latter again intended to be equal to $C_1 \sin(\omega_g t)$ where $\omega_g$ is the radian frequency equivalent of the modulation frequency $f_g$. Assuming that a phase shift equal to $\theta + \psi_1$ can be added by phase-sensitive detector 23 to its reference signal, the output of that detector with such a generator 20 output signal will then be the following:

$$V_{23\text{-}out} = k'J_1(\phi_m)\sin\phi_R$$

The constant k' accounts for the system gains through phase-sensitive detector 23.

As can be seen from this equation, the output of phase sensitive detector 23 depends on the amplitude $\phi_m$ supplied by bias modulator 19 as operated by bias modulation generator 20 can be used to set the value of the signal at the output of phase-sensitive detector 23 for a given rotation rate of coil 10 about its axis, i.e., set the scale factor for the gyroscope at least within a range of possible values therefor.

However, these expected results may not be achieved in the system of FIG. 1. One reason for failing to achieve the expected results is that bias modulation signal generator 20, in modulating the light in the optical path at frequency $f_g$ as described above through phase modulator 19, not only results in harmonic components being generated in photodetection system 14 by the recombined electromagnetic waves, but also directly supplies some harmonic components in the varying optical path phase because of nonlinearities occurring both in generator 20 and modulator 19.

That is, as a first possibility, the output signal supplied by modulation generator 20 at its output may contain not only a fundamental signal at frequency $f_g$, but also significant harmonics thereof. Even if a signal free of such harmonics could be provided, nonlinear component characteristics and hysteresis in phase modulator 19 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated.

The "proper" frequency is selected to be that frequency which results in the modulating of one of the waves 180 degrees out of phase with the modulation of the other. This modulation providing 180 degrees of phase difference between the two waves has the effect of eliminating modulator induced amplitude modulation of the resulting photodetector signal. The value of the "proper" frequency can be determined from the length of the optical fiber and the equivalent refractive index therefor.

The resulting signal output of the phase sensitive demodulator follows a sine function, i.e. the output signal depends on the sine of the phase difference between the two electromagnetic waves impinging on the photodiode, primarily the phase shift due to rotation about the axis of the coil. A sine function is an odd function having its maximum rate of change at zero, and so changes algebraic sign on either side of zero. Hence, the phase sensitive demodulator signal can provide both an indication of which direction a rotation is occurring about the axis of the coil, and can provide the maximum rate of change of signal value as a function of rotation rate near a zero rotation rate, i.e. has its maximum sensitivity near zero phase shifts, so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator are a substantial improvement over the characteristics of the output current of the photodetector.

Nevertheless, the phase sensitive demodulator output, in following a sine function, results in an output that at rotation rates further from zero, is less and less linear. For rotation rates of an amplitude sufficient to be past one of the peaks of the sine function, the output response value because of being periodic will be ambiguous with respect to just which rotation rate is occurring. Thus, there is a strong desire to operate the gyroscope so that the output signal of the phase sensitive demodulator stays within the linear region near the zero rotation rate value.

This can be accomplished by adding a further phase modulator, or frequency shifter, near the coil in an optical path portion used by the opposite direction traveling electromagnetic waves propagating through the coiled optical fiber to reach the photodetector. This phase modulator, or frequency shifter, is operated in a feedback loop from the photodetector system, and provides sufficient negative feedback such that the phase modulator introduced phase change is just enough to cancel the phase shift difference between the opposite traveling direction electromagnetic waves resulting from a rotation about the axis of the coiled optical fiber. As a result, there will be little phase shift difference occurring at the photodetector except for transient rotation rate changes, and so little phase shift sensed by the phase sensitive demodulator. Thus, the output signal of this phase sensitive demodulator will always be near to, or at, zero. The signal from a generator connected to the phase sensitive demodulator for operating this additional phase modulator, through providing a signal directing the modulator to provide a particular phase shift sufficient to cancel the phase shift due to rotation, will thus contain within it or a related signal the information as to the magnitude and direction of the rotation rate.

Several forms for the output signal from the generator connected to the phase sensitive demodulator in the feedback loop have been suggested for operating this additional optical phase modulator. One common and good choice is to use a serrodyne generator which applies a sawtooth-like signal to the optical phase modulator. A sawtooth or sawtooth-like signal is chosen because it can be shown that an ideal sawtooth signal of $2\pi$ phase amplitude provides what amounts to a pure frequency translation for the modulated electromagnetic waves, a single-sideband modulator. As a result, light passing through the phase modulator being operated with such a sawtooth signal will leave the modulator with its frequency translated by an amount equal to the frequency of the sawtooth signal. A non-ideal sawtooth signal won't result in pure frequency translation, there instead will be added harmonics generated which can be kept small by providing very nearly a sawtooth waveform and by good design of the modulator.

Since the optical phase modulator so operated will be on one side of the coiled optical fiber, one of the electromagnetic waves will have its frequency translated upon entering the coil while the other will not have its frequency translated until it exits the coil. Hence, one wave traverses the loop having a higher frequency than the other (though both have the same frequency on reaching the photodetector) with the result that, for a fixed modulator (or serrodyne generator) frequency, one will have a phase shift with respect to the other at the photodetector in an amount set by the frequency of the sawtooth and the nature of the fiber of $2\pi\tau\Delta f$. Here, $\Delta f$ is the modulator or generator frequency, and $\tau$ is the transit time of the light waves through the coil. This phase shift will act to counter the phase shift between the light waves, caused by rotation, because of the negative feedback loop in which the modulator is provided. Thus, the frequency of the sawtooth, or sawtooth-like generator output signal will be an indication of the rotation rate, and the polarity of the sawtooth will indicate the direction of rotation.

This is shown with configuration 5 in FIG. 2. Rather than to the rotation rate indicator 71 of FIG. 1, the signal from phase sensitive detector 23 goes to a servo electronics 73 which is incorporated in FIG. 2. This signal indicates the magnitude and sign of the phase difference between beams. In response to such phase difference, servo electronics outputs a phase ramp signal that goes to phase modulator 19, via summer 72, or to another or additional modulator, to phase-shift one beam relative to the other beam so as to bring the beams in phase with each other. The feedback signal required to return beams into phase, such as the frequency of the sawtooth in the serrodyne modulation case, is an indication of the rate of rotation of sensing loop. This signal then is supplied to a rotation rate indicator 71 which provides a convenient and readily useful indication of rotation rate of loop.

In recent years, researchers have developed interferometric fiber optic gyroscopes (IFOGs) with 0.01 degree per hour bias stability performance over the entire military temperature range. One important reason for this achievement is the discovery of the benefits of performing the phase bias modulation at the proper frequency of the IFOG sensing coil. By doing this, quadrature type errors are nearly eliminated. (Quadrature errors are unwanted signals that are synchronous with the desired rate signal but are 90 degrees out of phase with the rate signal). In fact, since quadrature errors can be suppressed so much, there has been no mention about these errors in recent literature. Currently, there are efforts underway to push the bias performance of an IFOG to 0.001 degree per hour over the military temperature range. At this level of performance, quadrature errors once again become an important issue.

The two most common and significant quadrature errors in an IFOG are due to intensity modulation and second harmonic phase modulation (or any even harmonics) generated by the bias phase modulator. Both of these error mechanisms generate an optical signal at the photodetector, which is synchronous and 90 degrees out of phase with the desired rate signal. Since these error signals are 90 degrees out of phase, demodulating the rate signal with a perfect phase sensitive demodulator (PSD), or lock-in amplifier, would perfectly reject the error signals and thus no bias error would be present in the gyroscope output. Unfortunately, since the gyroscope electronics phase shifts the signals, and since the phase shifts are not stable with temperature, a real PSD will not perfectly reject the quadrature error signals. Typically, the best one can expect to reduce the bias errors due to the quadrature error signals by quadrature rejection, is a factor of 10 to 100 over temperature. This is one reason why operating at the proper frequency becomes important.

The quadrature error signals go to zero when the bias modulation frequency is adjusted to the proper frequency of the sensing coil. One can produce very accurate and stable frequencies, and the proper frequency only changes about 10 parts per million (PPM) per degree Centigrade (C.). Between quadrature rejection of the rate PSD and operation about the proper frequency, quadrature errors become insignificant at 0.01 degree per hour performance levels. However, to achieve a significant improvement in bias performance, it may be necessary to further reduce the effects of quadrature errors. It is probably impractical to improve the quadrature rejection, but it seems reasonable to improve the operation about the proper frequency by tracking the proper frequency.

One simple way to track the proper frequency is to monitor the temperature of the sensing coil. The proper frequency dependence on temperature is fairly linear and predictable. Once this dependence is calibrated and stored in some memory, then the modulation frequency of an operating gyroscope can be continuously adjusted to the proper frequency predicted from the measured coil temperatures. This technique of tracking the proper frequency will certainly work better then no tracking, but does have some limitations. First of all, this technique requires an accurate calibration before the gyroscope can meet operating specifications. Second, the accuracy and stability of the calibration may not be sufficient to guarantee the desired bias performance. Third, there are parameters other than temperature that can change the proper frequency such as barometric pressure, constant acceleration, or Kerr effect.

SUMMARY OF THE INVENTION

What is ideal is finding an optical signal having an amplitude that depends on the frequency difference between bias modulation and actual proper frequency and goes to zero, specifically, when the bias modulation frequency equals the proper frequency. This type of signal is a discriminant.

A proper frequency discriminant can be used to drive a servo which in turn controls the bias modulation frequency. The servo (which can be a simple integrator) maintains the proper frequency discriminant at zero by controlling the bias modulation frequency. Since the discriminant is zero only when the bias modulation frequency equals the proper frequency, then the servo will always maintain the bias modulation frequency at the proper frequency, no matter what effect tends to the proper frequency. Using a discriminant and servo has the advantages of being more accurate and does not require any pervious calibration.

The trick (this invention) is to find a good proper frequency discriminant. What is ironic is that one can use the quadrature error signal as a proper frequency discriminant to control the bias modulation frequency to eliminate the quadrature errors. In order to use the quadrature error as a discriminant, a second PSD must be employed. An IFOG may employ a quadrature PSD to demodulate the proper frequency discriminant. The quadrature PSD is no different than the rate PSD except that the reference signal is phase shifted 90 degrees.

The inherent intensity modulation of the phase modulator may not be stable enough or large enough to provide a good discriminant. By applying a direct current (DC) voltage to the phase modulator, the intensity modulation can be increased to a relatively stable level thus producing a good discriminant. Another way to produce a good discriminant is to add second harmonic drive voltage to the phase modulator.

The proper frequency tracker may be used in the PM (polarization maintaining) or depolarized fiber optic gyroscope, having either the open loop or the closed loop configuration. PM open loop and closed loop configurations are shown in FIGS. 1 and 2, respectively. The depolarized versions of the fiber optic gyroscopes would have a depolarizer at or near each end of the optical fiber sensing loop, and the sensing loop would be made from single mode fiber, i.e., non-PM fiber.

DESCRIPTION OF THE EMBODIMENTS

Figure 3:
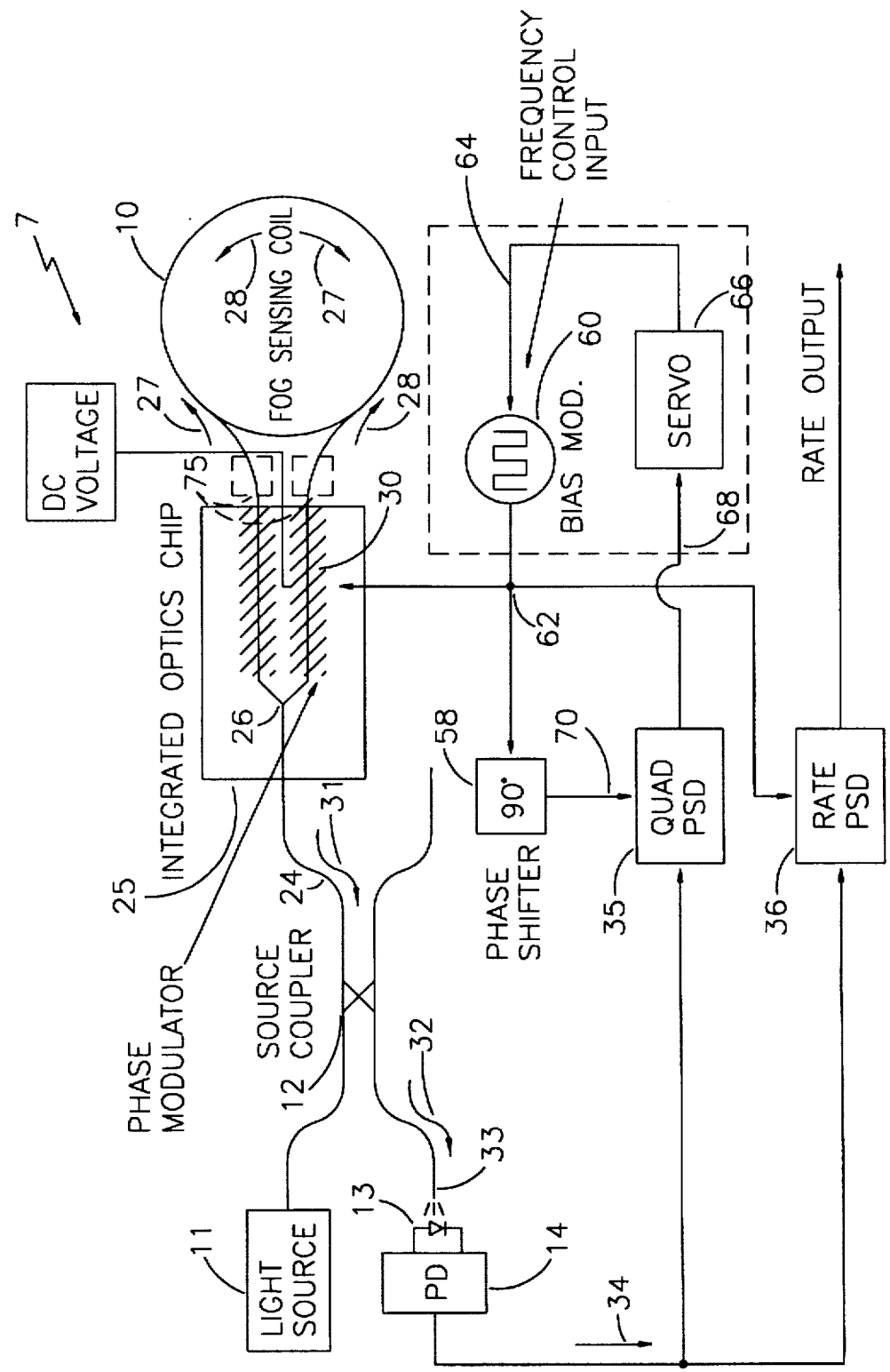
FIG. 3 shows a IFOG configuration incorporating the invention which uses intensity modulation to produce the quadrature signal for proper frequency tracking.

FIG. 3 is a diagram of an IFOG 7 incorporating a design for proper frequency tracking. A light beam from light source 11 goes through coupler 12 on through fiber 24 to integrated optic circuit 25 (IOC). That light beam is split at junction 26 into light beams 27 and 28. Beams 27 and 28 enter opposite ends of optical fiber sensing coil 10, respectively, and counterpropagate through coil 10. Beams 27 and 28 exit the other ends of coil 10, respectively, and enter IOC 25 to be combined at junction 26 into light beam 31. IOC 25 may be made with the technology of lithium niobate, proton exchange, silicon or that of other materials and/or processes. IOC 25 may be replaced with a optical fiber coupler providing the splitting and combining of junction 26. Modulator 30 may be replaced with a modulator such as one having optical fiber wound around a piezoelectric bobbin, core, spool or mandrel, or having some other structure, material and/or functional characteristics, which may be placed within sensing coil 10 proximate to one of the ends of the coil. If a polarizer is used in the fiber optic gyroscope, it may be placed between source coupler 12 and junction 26 or an optical fiber coupler used as a splitter/combiner for light beams 27 and 28.

If there is rotation of coil 10 about an axis that is at the center of coil 10 and perpendicular to a plane encompassing coil 10, light beams 27 and 28 which enter coil 10 having a zero phase difference relative to each other, see a different light path relative to each other and thus exit coil 10 having a phase difference relative to each other. This phenomenon is caused by what is regarded as a Sagnac effect, in that motion of the medium of the light beam affects the length of its light path. The amount of phase difference caused by this phenomenon is an indication of a rate of rotation of coil 10 about its axis.

IOC 25 has a modulator 30 that may phase modulate entering beam 28 and exiting beam 27, with a signal that provides bias phase modulation, and in a closed loop configuration a phase nulling signal that reduces the phase difference of beams 27 and 28 when exiting coil 10 to zero. The amount of phase modulating signal required for nulling is an indication of a rate of rotation of coil 10 about its axis, provided that there are no other factors contributing to a phase difference between beams 27 and 28 thereby providing a false or erroneous indication of rotation that does not exist.

Light beam 31 propagates though fiber 24 to source coupler 12. A portion of beam 31 goes through port 33 of coupler 12 and impinges photodiode 13 which provides an electrical signal representing beam 31 to photodetection electronics 14. A electrical signal 34 is a processed signal from photodetector 13, outputted by device 14. Signal 34 goes to a quadrature phase sensitive phase shifter 35 and a rate phase sensitive detector 36. A 90 degree phase shifter 58 has an output connected to an another input of quadrature phase sensitive detector 35. A bias phase modulation generator 60 has an output terminal connected to an input of 90 degree phase shifter 58 and to an input of rate phase sensitive detector 36. Generator 60 also has its output connected to phase modulator 30. Generator 60 outputs an electrical periodic bias phase modulation signal 62 which has a frequency, that goes to detector 36, shifter 58 and modulator 30. 90 degree phase shifter 58 phase shifts signal 62 90 degrees as an output signal 70 to detector 35. Modulator 30 modulates beams 27 and 28 according to signal 62. The frequency of signal 62 of generator 60 is variable and, for proper frequency tracking, is controlled by a signal 64 from a servo 66 which is an integrator and in turn has an input signal 68 from quadrature phase sensitive detector 35.

Signal 34 from photodetection electronics 14, is demodulated by phase sensitive detectors 35 and 36. Rate phase sensitive detector 36 demodulates that portion of signal 34 that is in phase with modulation signal 62. Quadrature phase sensitive detector demodulates quadrature signals 34 and 70 and drives with a signal 68, servo 66 which controls the frequency of modulation signal 62 to provide the tracking of the modulation signal 62 frequency to the proper or eigen frequency of sensing coil 10, which amounts to a closed loop servo reducing of the quadrature error discriminant of signal 34 and relative to signal 70. A DC voltage (e.g., several volts) is applied to the opposite electrode of phase modulator 30 in order to increase the intensity modulation which produces the quadrature signal used to provide the discriminant in signal 34. This DC voltage does not affect the phase modulation.

Increasing the quadrature error to produce a good discriminant to eliminate the quadrature error may seem like a "chicken and egg" problem. A question is whether this approach actually reduces the overall bias performance that is limited by quadrature errors. The best measurement that each phase sensitive detectors 35 and 36 can perform is limited by relative intensity noise such as excess noise or photon shot noise. Therefore, there will be some uncertainty in measuring the discriminant which means the bias modulation frequency will somewhat fluctuate randomly about the proper frequency. The amplitude of the fluctuation will depend on the amount of relative intensity noise. What helps here is quadrature rejection.

One can show that the quadrature signal $\Delta P_{quad}$ from photodetector 14 is proportional to the frequency difference $\Delta \omega$ between the bias modulation frequency and the proper frequency $\omega_p$, and is also proportional to the fractional intensity modulation $\eta$ that phase modulator 30 imposes on each counter propagating beam, 27 and 28, respectively.

$$\Delta P_{quad} = \frac{\pi}{4} \eta P_0 \frac{\Delta \omega}{\omega_p} \quad (1)$$

In equation 1, $P_0$ is the detected power if there is no phase bias and no modulation. Adding a DC voltage to phase modulator 30 increases $\eta$, therefore a large quadrature signal will be detected for a given frequency. Bias modulation frequency servo 66 will try to minimize $\Delta P_{quad}$ by controlling $\Delta \omega$ to a null. However, photon shot noise and other errors in measuring $\Delta P_{quad}$ will limit how small am can be made. Assuming that the uncertainty in $\Delta P_{quad}$ is fixed, then by increasing $\eta$, a smaller $\Delta \omega$ can be obtained, therefore the bias modulation signal 62 frequency can be controlled closer to the proper frequency or eigen frequency of coil 10. Equation 2 relates the in phase signal $\Delta P_{rate}$ at photodetector 14 to a rotation rate $\Delta \Omega$.

$$\Delta P_{rate} = P_0 SF \Delta \Omega \quad (2)$$

The open loop scale factor of gyroscope 7 is SF. One can use equations 1 and 2 to determine how small $\Delta \omega$ can be made. By careful design, the measurement made by quadrature phase sensitive detector 35 should be just as good as the measurement made by the rate phase sensitive detector 36.

Therefore, one can assume that $\Delta P_{quad} = \Delta P_{rate}$, which allows one to relate $\Delta\omega$ to the uncertainty in rate $\Delta\Omega$.

$$\frac{\Delta\omega}{\omega_p} = \frac{4SF}{\pi\eta}\Delta\Omega \qquad (3)$$

One can also define a bias signal $\Delta P_{bias}$ which is demodulated by rate phase sensitive detector 36 and is due to intensity modulation.

$$\Delta P_{bias} = \frac{\pi}{4}\eta P_0 \Delta\theta \frac{\Delta\omega}{\omega_p} \qquad (4)$$

One can see that the only difference between equations 1 and 4 is that equation 4 has the angle $\Delta\theta$, which represents the quadrature rejection of rate phase sensitive detector 36. This equation shows one how much of the intensity modulation is demodulated by rate phase sensitive detector 36. By using equation 3, one can determine how much rate bias $\Delta\Omega_{bias,quad}$ is indicated by the gyroscope, due to intensity modulation $\eta$, finite quadrature rejection $\Delta\theta$, and a small frequency difference $\Delta\omega$ from the proper frequency.

$$\Delta\Omega_{bias,quad} = \frac{\pi\eta\Delta\theta}{4SF}\frac{\Delta\omega}{\omega_p} \qquad (5)$$

Inspection of equation 5 indicates that the rate bias $\Delta\Omega_{bias,quad}$ increases when one increases the intensity modulation to produce a good discriminant. However, equation 3 shows that the increase in $\eta$ is countered by the decrease in $\Delta\omega$, as long as bias modulation frequency servo 66 is active. By substituting equation 3 into equation 5, one gets $$\Delta\Omega_{bias,quad} = \Delta\theta\Delta\Omega \qquad (6)$$

Equation 6 shows one that the rate bias $\Delta\Omega_{bias,quad}$ due to intensity modulation will always be less than the minimum detectable rate $\Delta\Omega$ as long as bias modulation frequency servo 66 is employed and rate phase sensitive detector 36 has some finite quadrature rejection ($\Delta\theta<1$). (Typically, the quadrature rejection is better than a factor of 10 or $\Delta\theta<0.1$.) Furthermore, one can increase the amount of intensity modulation, produced by phase modulator 30, to generate a good proper frequency discriminant, without generating an unwanted rate bias error.

Increasing the intensity modulation is not the only way of producing a good proper frequency discriminant. One could also add second harmonic to the phase modulator. What is very important is that the second harmonic is added in a fashion such that it generates a error signal that is in quadrature phase to the desired rate signal. If this is done, then analysis on this approach would look very similar to the analysis just presented. Most importantly, the same relationship shown in equation 6 would be derived. In summary, there has been disclosed a means of tracking the proper frequency to control the bias modulation signal 62 frequency to the proper frequency. This method uses a second phase sensitive detector 35 to demodulate quadrature signals which provide a discriminant of the proper frequency. The discriminant can be increased to usable levels by exacerbating the intensity modulation or second harmonic phase modulation produced by phase modulator 30. The analysis has shown that this process does not increase the overall bias errors of the gyroscope.

Figure 1:
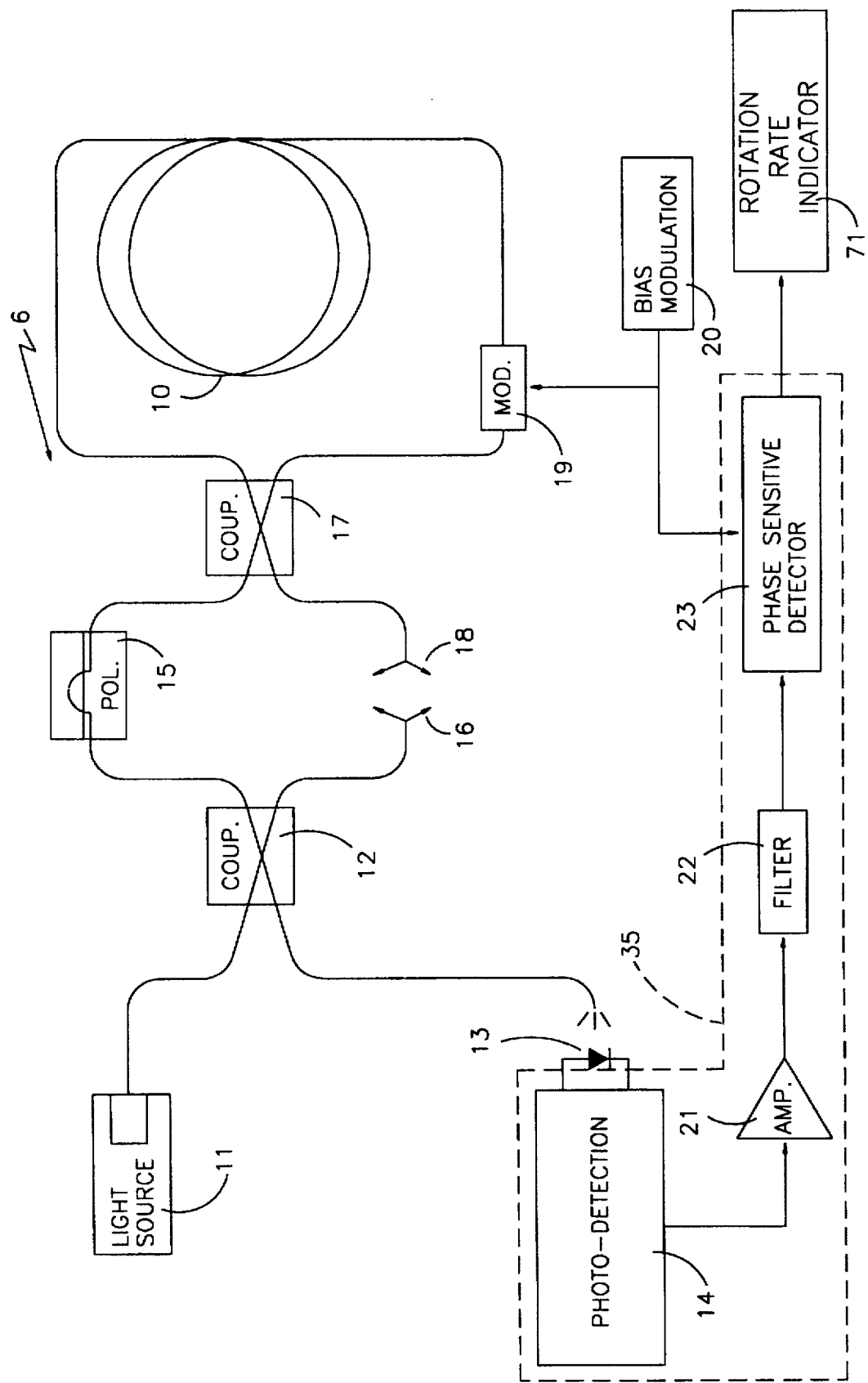
FIG. 1 is a diagram of an open loop fiber optic gyroscope in the related art.
Figure 4:
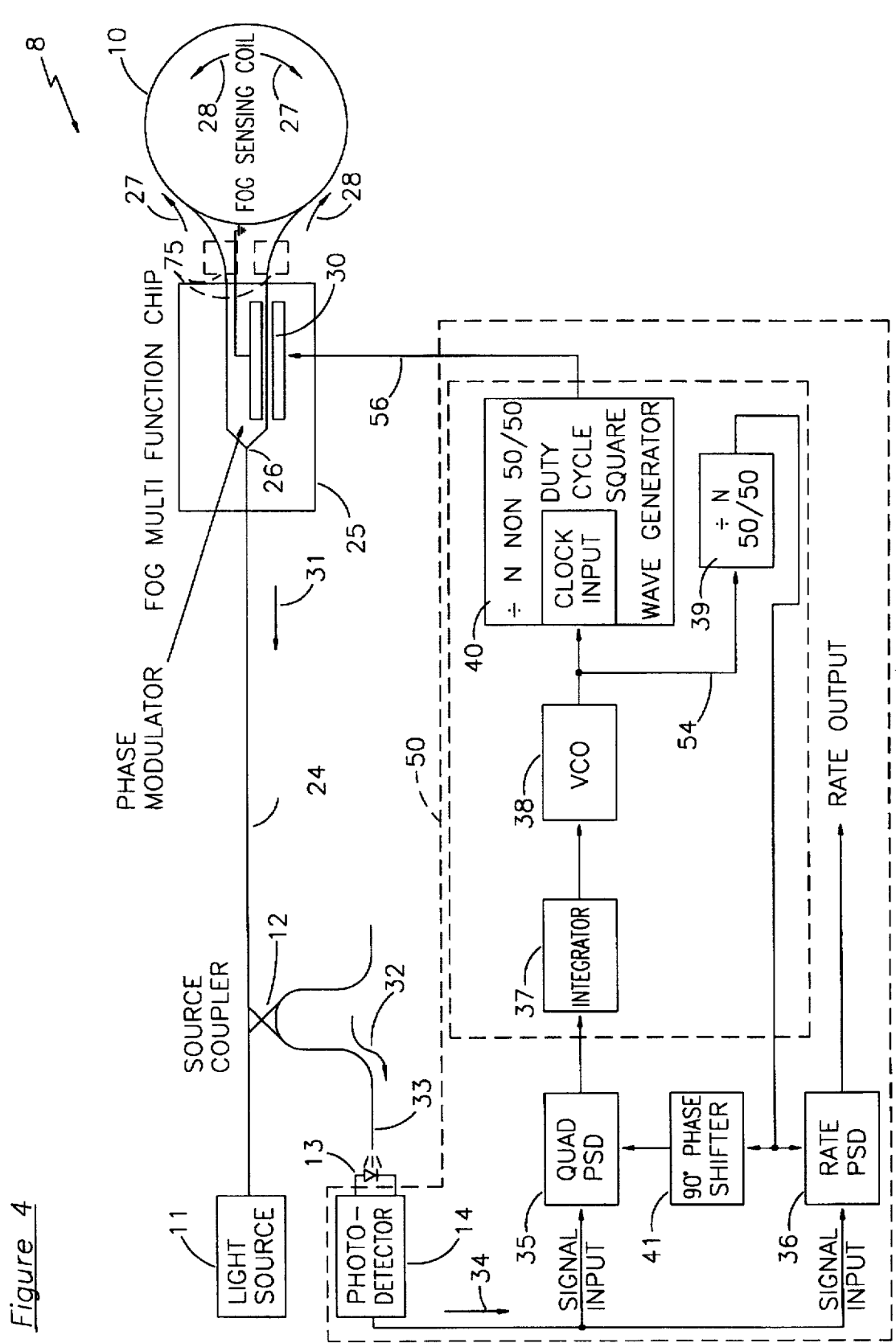
FIG. 4 shows a IFOG configuration incorporating the invention which uses a digital implementation along with introducing harmonics produce the quadrature signal for proper frequency tracking.

Configuration 8 of FIG. 4 is similar to configuration 6 of FIG. 1 as described in the background of this invention. Configurations 7 and 8 of FIGS. 3 and 4, respectively, may be depolarized or PM gyroscopes. The depolarized versions will have depolarizers 75 at the ends of sensing coil 10 and sensing coil 10 will have single mode fiber or non-PM fiber.

FIG. 4 is a diagram of fiber optic gyroscope 8 having a non-50/50 duty cycle bias modulation for tracking the proper or eigen frequency of coil 10.

Light source 11 outputs typically broadband light having wavelength of about one micron, which goes through source coupler 12 via fiber 24 on into a multifunction integrated optic circuit (IOC) 25. A fiber coupler, for splitting and combining light beams, may be used in lieu of the IOC; and if there is a polarizer in the system, it may be a component situated between the source coupler and the splitter/combiner coupler. Servable functions of IOC 25 include polarizing the light from fiber 24, splitting the light at junction 26 into beams 27 and 28 that counterpropagate relative to each other in sensing coil 10, and modulator 30 which phase modulates light beam 28 as it enters coil 10 and light beam 27 as it exits coil 10. Phase modulator 30 bias phase modulates light beams 27 and 28 at an eigen frequency which is a proper frequency of the coil wherein errors due to an improper frequency of phase modulation of light beams 27 and 28 result in an erroneous rotational rate indication.

After light beams 27 and 28 exit coil 10, they return and enter IOC 25 and are combined at junction 26 and combined light beam 31 exits IOC 25, goes down fiber 24 and enters coupler 12. A portion 32 of light beam 31 comes out of port 33 of coupler 12 and impinges photodiode 13. Photodiode 13 converts light beam 32 into an electrical signal which enters photodetector electronics 14 to output an appropriate electrical signal 34 representing signal 32 for entry into a quadrature phase sensitive detector 35 and to a rate phase sensitive detector 36. The output of quadrature phase sensitive detector 35 goes to integrator 37 which integrates the signal. The output of integrator 37 goes on to a voltage controlled oscillator 38. Voltage controlled oscillator 38 may be a standard integrated circuit part. The frequency stability of the voltage controlled oscillator 38 is not very important. The output of voltage controlled oscillator goes to a divide by N non-50/50 duty cycle square wave generator 40, where N is an integer greater than one. The output of square wave generator 40 is connected to phase modulator 30 and drives phase modulator 30 to phase modulate counterpropagating light beams 28 and 27. The output of oscillator 38 also goes to a divide by N/2 50/50 divider 39 which has an output that goes to rate phase sensitive detector 36 and to a 90 degree phase shifter 41. Non-50/50 duty cycle square wave generator 40 produces a desirable waveform, having a frequency that is an Nth fraction of the VCO 38 clock frequency, by making one half cycle of the period of the waveform of the generator 40 output one VCO 38 clock cycle shorter then the normal one half of the period of one full cycle of the waveform of the generator output.

Figure 5:
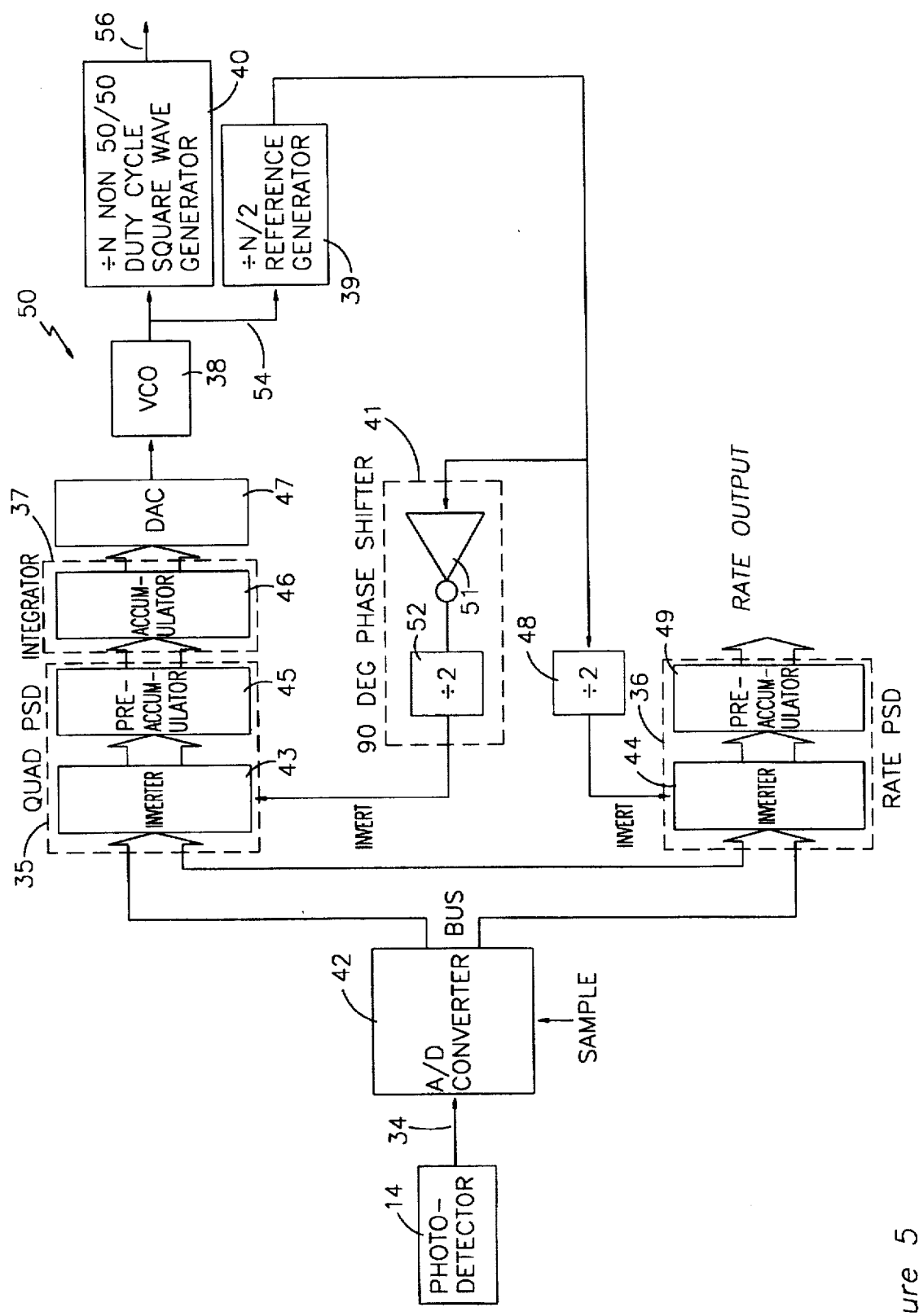
FIG. 5 is detailed diagram of the electronics of the digital implementation in FIG. 4.

FIG. 5 shows a digital implementation of electronics of gyroscope 8 of FIG. 4. The output signal 34 of detector 14 goes to an analog-to-digital converter 42 which has an input sample signal terminal and a digital output signal bus terminal which is connected to inverter 43 of quadrature phase sensitive detector 35 and inverter 44 of rate phase sensitive detector 36. Output of inverter 43 goes to preaccumulator 45 of quadrature phase sensitive detector 35. Output of preaccumulator 45 goes on to accumulator 46 of integrator 37, and the output of accumulator 46 goes on to a digital-to-analog converter 47. An analog output voltage is provided from digital-to-analog converter 47 to voltage control oscillator 38 which in turn has a variable frequency clock output 54 as determined by the input voltage to voltage control oscillator 38. Clock output 54 of voltage control oscillator 38 goes to divide-by-N non-50/50 duty cycle square wave generator 40 and to divide-by-N/2 50/50 reference clock signal generator 39.

The output of generator 40 is a biased phase modulation signal at a proper eigen frequency that goes to modulator 30. The output of reference generator 39 goes to phase shifter 41 and to divide-by-2 converter 48 which outputs an invert signal that goes to inverter 44. The invert signal causes inverter 44 to flip the polarity sign of the data at every bias modulation half cycle. Thus, the output of inverter 44 causes a preaccumulator 49 to reset at every cycle of the bias phase modulation signal. The output of preaccumulator 49 is a rotation rate output which indicates the rate of rotation of sensing coil 10 of gyroscope 8.

The output of generator 39 that goes to 90° phase shifter 41 goes through an inverter 51 of phase shifter 41. The frequency of the output signal of reference generator 39 is ½ the frequency of the bias phase modulation signal of generator 40. The output of inverter 51 goes to a divide-by-two converter 52 of 90 degree phase shifter 41 which outputs an invert signal that goes to inverter 43. The invert signal causes inverter 43 to flip the polarity sign of the data going through it at every half cycle of the bias phase modulation signal. That causes preaccumulator 45 to reset at every cycle of the bias phase modulation signal. The output of preaccumulator 45 is accumulated, that is, integrated by accumulator 46.

The rotation rate output of rate phase shift detector 36 may go on to a rotation rate indicator in the case of an open loop configuration of gyroscope 8 or on to a servo electronics of a closed loop gyroscope 8. The servo electronics through phase modulator 30, via a summing amplifier with the bias phase modulation signal, or through another or additional phase modulator, causes the phase difference of beams 27 and 28 caused by rotation of sensing coil 10, to be nulled to a zero phase difference.

Figure 6:
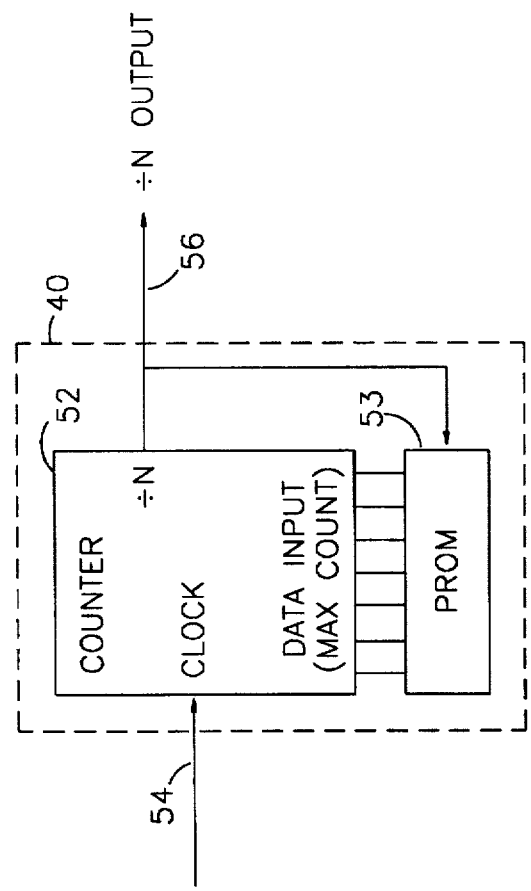
FIG. 6 shows a non-50/50 duty cycle wave generator.

FIG. 6 is a diagram of wave generator 40. Output clock signal 54 of voltage control oscillator 38 goes to a clock input of counter 52 which outputs a divided-by-N signal 56 as the output of generator 40, which has a frequency that is 1/Nth of the VCO 38 clock signal 54 frequency. The output of counter 52 also is fed to a clock input of programmable read-only memory (PROM) 53. PROM 53 outputs a maximum count signal to data input of counter 52, which determines the number of clock cycles needed for each half cycle of the generator 40 divide-by-N output.

Figure 7:
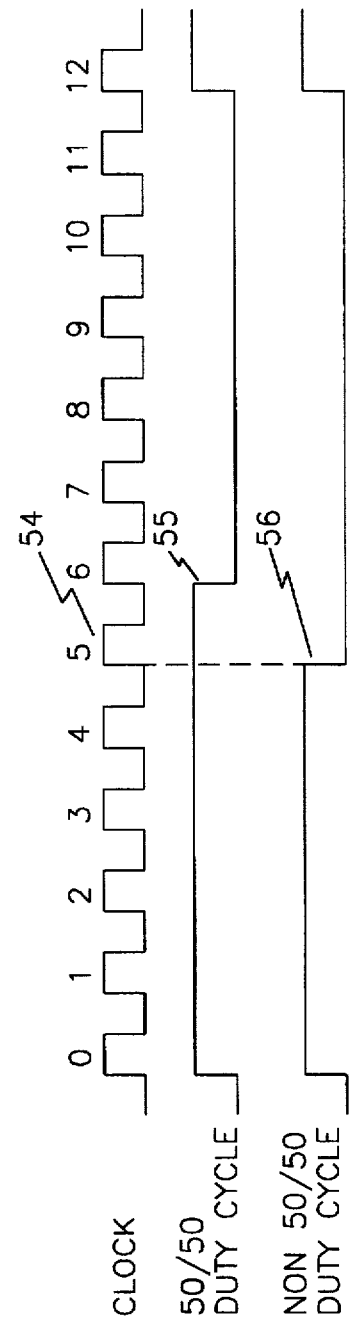
FIG. 7 is a timing diagram of waveforms associated with the generator output to the modulator.

FIG. 7 is a timing diagram of generator 40 signals. VCO clock signal 54 is the input signal to counter 52 and signal 55 is the 50/50 duty cycle produced by divide-by-N counter 52. However, the actual output of counter 52 is a non 50/50 duty cycle signal 56 which has the first half of the cycle shortened by one cycle of clock signal 54 and the second half of the non 50/50 duty cycle signal 56 is lengthened by one cycle of clock signal 54.

Figure 2:
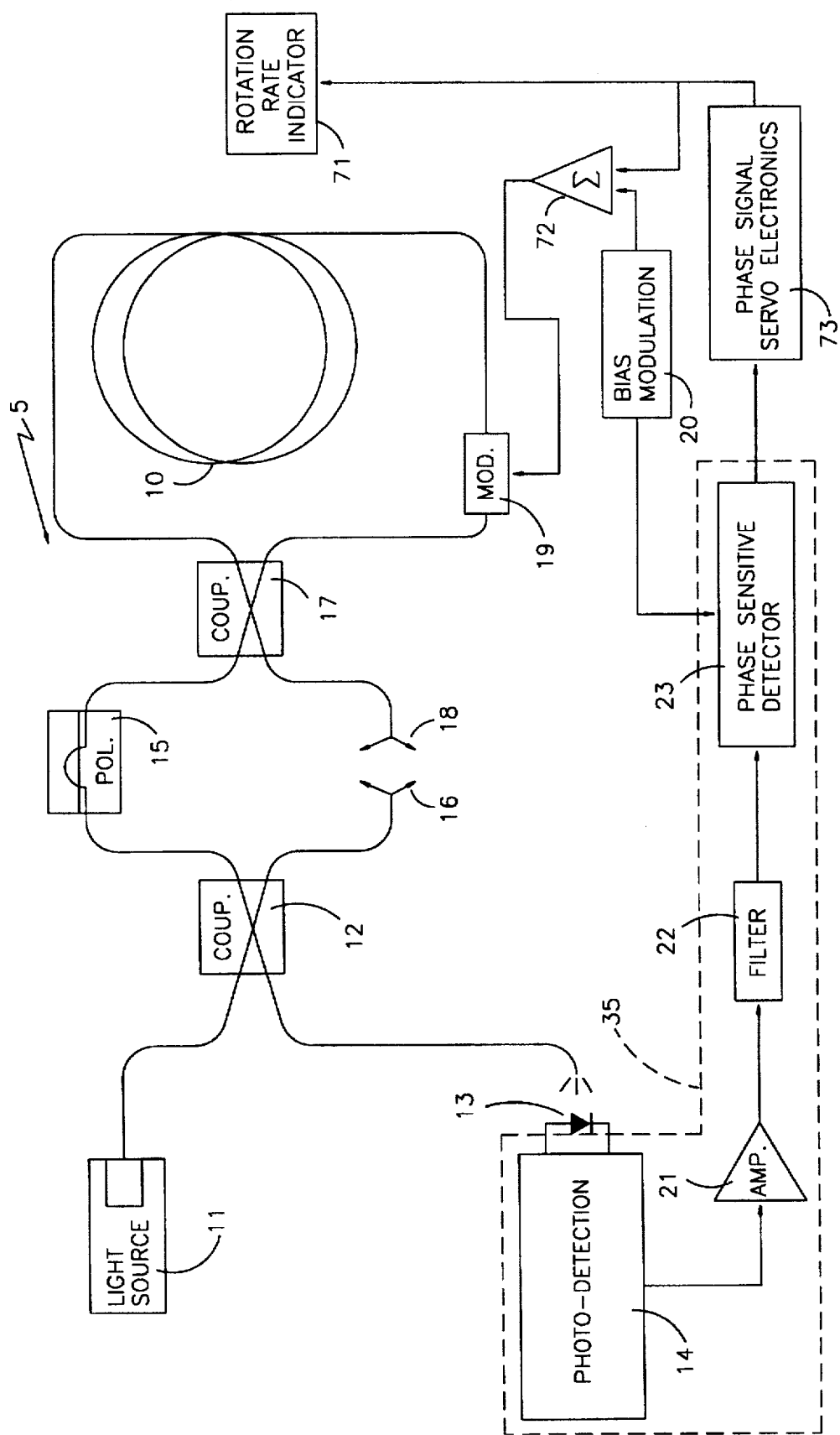
FIG. 2 is a diagram of a closed loop fiber optic gyroscope in the related art

The following is an analysis showing how the proper frequency invention works for the embodiment of configuration 8 of FIGS. 2–4. L is the physical length of the sensing coil 10 fiber, including the path of beams 27 and 28 up to junction 26 of IOC 25.

The transit time τ is the time required for light to pass through sensing coil 10. τ is $$\tau = \frac{nL}{c} \quad (1)$$

where n is the index of refraction and c is the speed of light in a vacuum. The optical power at the output of the sensing coil 10 is $$P = \frac{1}{2} P_0(1 + \cos\Delta\phi(t)) \quad (2)$$

where $P_o$ is the maximum power and $\Delta\emptyset(t)$ is the phase difference between counterpropogating waves or light beams 27 and 28. To make gyroscope 8 sensitive to low rotation rates, one applies a bias modulation 56 using phase modulator 30. To simplify the analysis, let one can apply a sinusoidal bias phase modulation 56 of the form $\emptyset_1 \cos \omega_m t$. Now to generate an error signal that indicates a difference between the bias modulation 56 frequency $f_m$ and the proper or eigen frequency $f_p$, one applies a second harmonic phase modulation having the form $\emptyset_2 \cos [2\omega_m t + 2\theta]$. The total phase difference between counterpropogating waves 27 and 28 can be written as $$\Delta\emptyset(t) = \emptyset(t) - \emptyset(t-\tau) + \Delta\emptyset_R \quad (3)$$

where $\emptyset(t)$ is the phase modulation.

$$\emptyset(t) = \emptyset_1 \cos \omega_m t + \emptyset_2 \cos (2\omega_m t + 2\theta) \quad (4)$$

By substituting equation 4 into equation 3 and using trigonometric indentities, one gets $$\Delta\emptyset(t) = a\sin[\omega_m t - \psi_1] + b \sin[2\omega_m t - \psi_2] + \Delta\emptyset_R \quad (5)$$

where $$a = -2\phi_1 \sin\left[\frac{\omega_m \tau}{2}\right] \quad (6)$$

$$b = -2\phi_2 \sin[\omega_m \tau]$$

$$\psi_1 = \frac{\omega_m \tau}{2}$$

$$\psi_2 = \omega_m \tau + 2\phi$$

By substituting equation 5 into equation 2 and using trigonometric identities, one gets for the cosine term $$\begin{aligned}
\cos\Delta\phi(t) &= \cos\Delta\emptyset_R \cos[a\sin(\omega_m t - \Psi_1) + b\sin(2\omega_m t - \Psi_2)] \quad (7)\\
&\quad (-T_1) - \\
&\quad \sin\Delta\emptyset_R \sin[a\sin(\omega_m t - \Psi_1) + b\sin(2\omega_m t - \Psi_2)] \\
&\quad (T_2) \\
&= (-T_1) - (T_2)
\end{aligned}$$

For small rotation rates ($\Delta\emptyset_R \ll 1$), one can make a small angle approximation $$\cos \Delta\emptyset_R \approx 1 \quad (8)$$

$$\sin \Delta\emptyset_R \approx \Delta\emptyset_R \quad (9)$$

One can see that the first term (T1) in equation 7 is approximately independent of rotation rate, where as the second term (T2) is approximately proportional to rotation rate Ω. It has been shown in the literature that $$\Delta\phi_R = \frac{2\Pi LD}{\lambda c} \dot{\Omega} \quad (10)$$

where

L is the length of the sensing loop,

D is the diameter,

λ is the wavelength, and c is the speed of light in a vacuum.

Using trigonometric identities, one can rewrite terms 1 and 2 of equation 7 as $$T1 = \cos[\alpha \sin(\omega_m t - \psi_1)] \cos[b \sin(2\omega_m t - \psi_2)] - \sin[\alpha \sin(\omega_m t - \psi_1)] \sin[b \sin(\omega_m t - \psi_2)] \quad (11)$$

$$T2 = -\Delta\emptyset_R\{\sin[\alpha \sin(\omega_m t - \omega_1)]\cos[b \sin(2\omega_m t - \psi_2)] + \cos[\alpha \sin(\omega_m t - \omega_1)]\sin[b \sin(\omega_m t - \psi_2)]\} \quad (12)$$

Expanding T1 and T2 into a series of Bessel functions, one finds the largest components of T1 and T2 that occur at the bias modulation 56 frequency $w_m$.

$$T1_\omega = 2J_1(a)J_1(b)\cos\left(\omega_m t - \frac{\omega_m \tau}{2} - 2\phi\right) \quad (13)$$

$$T2_\omega = -2\Delta\phi_R J_1(a)\sin\left(\omega_m t - \frac{\omega_m \tau}{2}\right) \quad (14)$$

where one substitutes equations 6c and 6d back into equations 11 and 12 and makes the following approximation $$J_o(b) \approx 1$$

since b is typically very small. Now one may assume that the bias modulation 56 frequency is very near the eigen frequency. Thus, $$\frac{\omega_m \tau}{2} = \frac{\Pi}{2} + \epsilon \quad (15)$$

where $\epsilon$ represents a small deviation from the eigen frequency. Equations 13 and 14 become $$T1_w = 2J_1(\alpha)J_1(b) \sin(\omega_m t - \epsilon - 2\theta) \quad (16)$$

$$T2_w = 2\Delta\emptyset_R J_1(\alpha) \cos(\omega_m t - \epsilon) \quad (17)$$

$T2_w$ is the rotation signal. Now break up $T1_w$ into inphase and quadrature components.

$$T1_{w,inphase} = 2J_1(\alpha)J_1(b)\cos(2\theta)\sin(\omega_m t - \epsilon) \quad (18)$$

$$T1_{w,quad} = -2J_1(\alpha)J_1(b)\sin(2\theta)\cos(\omega_m t - \epsilon) \quad (19)$$

Since one uses phase sensitive detector 36 to demodulate the gyro signal, only the $T1_{w,inphase}$ term will cause a rotation sensing error for an ideal phase sensitive detector. By intentionally applying a second harmonic phase modulation such that $2\theta = \Pi/2$, one can use the signal represented by $T1_{w,quad}$ to determine the eigen frequency of coil 10.

$$2\theta = \Pi/2 \quad (20)$$

$$T1_{w,inphase} = 0 \quad (21)$$

$$T1_{w,quad} = -2J_1(\alpha)J_1(b)\cos(\omega_m t - \epsilon) \quad (22)$$

Substitute equation 6b into equation 22 and make the approximation $J_1(b) \approx b/2$ and $\sin 2/\epsilon \approx 2$, then $$T1_{w,quad} = -4J_1(\alpha)\emptyset_2 \epsilon.$$

Therefore, the quadrature signal $T1_{w,quad}$ is proportional to the modulation frequency deviation $\epsilon$ away from the eigen frequency. The sensitivity to $\epsilon$ is enhanced by increasing the amplitude $\theta_2$ of the second harmonic phase modulation.

One gets the quadrature signal due to a square wave phase modulation signal having a non-50/50 duty cycle and by including the 1st, 2nd, 3rd and 4th harmonics in the analysis.

$$I_{wquad} = I_0\{J_1(Z_1)J_1(Z_2) + J_0(Z_1)J_1(Z_2)J_1(Z_3) + J_0(Z_1)J_1(Z_3)J_1(Z_4)\}\cos \omega t$$

(for 1st, 2nd, 3rd and 4th harmonics of a square wave modulation having a non-50/50 duty cycle)

$$I_{wquad} = I_0 J_1(z_1)J_1(z_2)\cos \omega t$$

(for sinewave modulation and a second harmonic)

Note that for square wave modulation, the intermodulation terms $J_0(Z_1)J_1(Z_2)J_1(Z_3)$ and $J_0(Z_1)J_1(Z_3)J_1(Z_4)$ enhance the sensitivity of $I_{wquad}$ to deviation from the eigen frequency, which is represented by $z_2$ and $z_4$. If one included all intermodulation terms associated with an ideal square wave modulation, the quadrature signal would be composed of an infinite number of intermodulation terms. Since the present electronics of configuration 8 and phase modulator 30 have a limited bandwidth, the square wave phase modulation signal 56 has a finite number of harmonics.

Using Fourier analysis, one finds that a square wave having a non-50/50 duty cycle can be represented by equation 3 and that $\Psi=0$, which gives a quadrature signal for tracking the eigen frequency and that all the even harmonics do have the same amplitude. The analysis is $$\phi(t) = \sum_{n=1}^{\infty} A_n \cos\left(\frac{2\pi nt}{T}\right) + B_n \sin\left(\frac{2\pi nt}{T}\right) \quad (1)$$

$$A_n = 0 \quad (2)$$

$$B_n = \frac{2\phi_A}{n\pi} \quad n = 1,3,5\ldots$$

Then one may add even harmonics to square wave modulation and assume that the amplitudes of the even harmonics are all the same.

$$\phi(t) = \sum_{n=1}^{\infty} \phi_{2n-1}\sin[(2n-1)wt] + \sum_{n=1}^{\infty} \phi_e\sin[2n\omega t + \Psi] \quad (3)$$
Odd Harmonics    Even Harmonics where $$\phi_{2n-1} = \frac{2\phi_A}{(2n-1)\Pi} \quad n = 1,2,3\ldots \quad (4)$$

The phase difference of counterpropagating waves is given by $$\Delta\emptyset(t) = \emptyset(t) - \emptyset(t-\tau) + \Delta\emptyset_R \quad (5)$$

where $\tau$ is the transit time through the loop and $\Delta\emptyset_R$ is the phase difference due to rotation. From equations 3 and 5 one has $$\Delta\phi(t) = \Delta\phi_R + \quad (6)$$

$$2\sum_{n=1}^{\infty}\phi_{2n-1}\sin\left[(2n-1)\frac{\omega\tau}{2}\right]\cos\left[(2n-1)\omega t - (2n-1)\frac{\omega\tau}{2}\right] +$$

$$\phi_e\sin\left[n\frac{\omega\tau}{2}\right]\cos\left[2n\omega t - n\frac{\omega\tau}{2} + \Psi\right]$$

where $\tau$ is the transit time through the loop and $\Delta\emptyset_R$ is the phase difference due to rotation. From equations 3 and 5 one has $$\Delta\phi(t) = \Delta\phi_R + \quad (7)$$

$$2\sum_{n=1}^{\infty}\phi_{2n-1}\sin\left[(2n-1)\frac{\omega\tau}{2}\right]\cos\left[(2n-1)\omega t - (2n-1)\frac{\omega\tau}{2}\right] +$$

$$\phi_e\sin\left[n\frac{\omega\tau}{2}\right]\cos\left[2n\omega t - n\frac{\omega\tau}{2} + \Psi\right]$$

One may make some definitions $$z_n \equiv 2\phi_m \sin\left[\frac{n\omega\tau}{2}\right] \quad n = 1,3,5\ldots \quad (7a)$$

$$z_n \equiv 2\phi_e \sin\left[\frac{n\omega\tau}{2}\right] \quad n = 2,4,6\ldots \quad (7b)$$

$$\theta \equiv n\omega t - \frac{n\omega\tau}{2} \quad n = 1,3,5\ldots \quad (7c)$$

$$\theta_n \equiv n\omega t - \frac{n\omega\tau}{2} + 4n = 2,4,6\ldots \quad (7d)$$

From equations 7 and 6 one has $$\Delta\phi(t) = \Delta\phi_R + \sum_{n=1}^{\infty} z_{2n-1} \cos\theta_{2n-1} + z_{2n} \cos\theta_{2n} \quad (8)$$

The optical intensity is $$I = \tfrac{1}{2}I_0(1+\cos \Delta\phi(t)) \quad (9)$$

If one were to continue with equations 9 and 10, the mathematics would become extremely difficult to work with. In order to determine the bias error due to the "mixing" of the harmonics, one will start with the most simple case, the first and second harmonic, and then progress to more complicated cases having more harmonics. One will be able to identify a trend in the progression of cases and derive an expression for the bias error due to thousands of harmonics.

At this time, one is only interested in quadrature bias errors due to even harmonics, because experimentally, one observed mostly quadrature errors for square wave modulation. It will be helpful to first derive an expression for the intensity $I_{w_1R}$ due to rotation. This expression will give the phase of the rate signal and allow one to distinguish between in phase and quadrature errors. Furthermore, one can use this expression to scale the errors in units of °/hr.

To find the signal $I_{w_1R}$ due to very small rotations $\Omega$, let one first assume pure sine wave modulation.

$$I_{\omega_1 R} = -I_0\Delta\phi_R J_1\left(2\phi_1\sin\left[\frac{\omega\tau}{2}\right]\right)\cos\left(\omega t - \frac{\omega\tau}{2}\right) \quad (10)$$

Therefore, one wants to look for error terms that occur at $$\sin\left(\omega t - \frac{\omega\tau}{2}\right).$$

The amplitude of the rotation signal $$|I_{\omega_1 R}| = -I_0\Delta\phi_R J_1\left(2\phi_1\sin\left[\frac{\omega\tau}{2}\right]\right) \text{ (sine wave modulation)} \quad (11)$$

For perfect square wave modulation at ±Π/2, one detects a square wave having an amplitude $\tfrac{1}{2}I_0\Delta\phi_R$. Assuming sinewave demodulation, the fundamental amplitude of the square wave rotation signal is $$|I_{w_1R}| = -\frac{1}{\Pi} I_0\Delta\phi_R \quad (12)$$

(±Π/2 square wave modulation, sine wave demodulation)

Now, one will derive the quadrature error for the simple case of a fundamental and second harmonic phase modulation. From equation 8 one has $$\Delta\phi(t) = \Delta\phi_R + z_1\cos\theta_1 + z_2\cos\theta_2 \quad (13)$$

Plug equation 12 into equation 9 and one gets $$I = \tfrac{1}{2}I_0(1+\cos[\Delta\phi_R + z_1\cos\theta_1 + z_2\cos\theta_2]) \quad (14)$$

The cosine term can be expressed as $$\cos[\Delta\phi_R + z_1\cos\theta_1 + z_2\cos\theta_2] = \cos\Delta\phi_R\cos[z_1\cos\theta_1 + z_2\cos\theta_2] - \sin\Delta\phi_R\sin[z_1\cos\theta_1 + z_2\cos\theta_2] \quad (15)$$

One is only interested in bias errors, not scale factor errors. Therefore, one can set $\Delta\phi_R = 0$. Equation 15 can be expressed as $$\cos[z_1\cos\theta_1 + z_2\cos\theta_2] = \cos[z_1\cos\theta_1]\cos[z_2\cos\theta_2] - \sin[z_1\cos\theta_1]\sin[z_2\cos\theta_2] \quad (16)$$

Next, one can make the following approximations with the Bessel functions $$\cos(z\cos\theta) = J_0(z) \quad (17a)$$

$$\sin(z\cos\theta) = 2J_1(z)\cos\theta \quad (17b)$$

Now one can rewrite $\cos(\Delta\phi(t))$ as $$\cos[\Delta\phi(t)] = J_0(z_1)J_0(z_2) - 4J_1(z_1)J_1(z_2)\cos\theta_1\cos\theta_2 \quad (18)$$

for relatively small modulation amplitudes.

Using equation 7, one can write the product $\cos\theta_1\cos\theta_2$ as $$\cos\theta_1\cos\theta_2 = \cos\left(\omega t - \frac{\omega\tau}{2}\right)\cos\left(2\omega t - \frac{\omega\tau}{2} + \Psi\right) \quad (19a)$$

$$= \frac{1}{2}\cos(\omega t + \Psi) + \frac{1}{2}\cos(3\omega t - \omega t + \Psi) \quad (19b)$$

Using equations 19b, 18 and 9, one find that the intensity is $$I = \tfrac{1}{2}I_0\{1 + J_0(z_1)J_0(z_2) - 2J_1(z_1)J_1(z_2)\cos[\omega t + \Psi] - 2J_1(z_1)J_1(z_2)\cos[3\omega t - \omega t + \Psi]\} \quad (20)$$

By comparing equations 20 and 10, and by noticing that the phase angle $$\omega\tau/2 \to \Pi/2$$

when the modulation signal 56 frequency goes to the proper frequency, one sees that the bias error will be a quadrature error if $\Psi=0$:

$$\Psi=0 \text{ (for quadrature errors)} \quad (21)$$

Assuming sine wave demodulation, one is only interested in terms that occur at $\omega$. One can write the quadrature error intensity signal as $$I_{wquad} = -I_0 J_1(z_1)J_1(z_2)\cos[\omega t] \quad (22)$$

Now plug in equations 7a and 7b into 22. Since the second harmonic amplitude $\emptyset_e$ is very small (thus $z_2$ is small), one can make the approximation $J_1(z_2) \approx z_2/2$. One can now express the amplitude of the quadrature error as $$|I_{wquad}| = -I_0\phi_e\sin[\omega t]J_1\left(2\phi_1\sin\left[\frac{\omega\tau}{2}\right]\right) \quad (23)$$

To find the quadrature error in terms of °/hr, one finds the effective phase difference that will give an intensity signal that compares to the quadrature signal. Rewrite equation 11 with the effective phase difference due to the second harmonic error.

$$|I_{wquad}| = -I_0\Delta\phi_{e_1quad}J_1\left(2\phi_1\sin\left[\frac{\omega\tau}{2}\right]\right) \quad (24)$$

Combining equations 24 and 23, one gets $$\Delta\phi_{e_1quad} = \phi_e \sin[\omega t] \quad (25)$$

Now to convert to °/hr, $$\Delta\phi_R = \frac{2\Pi LD}{\lambda c} \Omega \quad (26)$$

The quadrature error in terms of °/hr is $$\Omega_{e_1 quad} = \frac{\lambda c}{2\Pi LD} \epsilon \phi_1 \sin\left[\Pi \frac{f_m}{f_p}\right] \quad (27)$$

for relatively small modulation amplitudes, for phase modulation frequency, $$f_m = \omega/2\Pi$$

very near the proper frequency $f_p$½τ, and for $\emptyset_e$ expressed as a function of the modulation amplitude $\emptyset_1$, $$\emptyset_2 = \epsilon \emptyset_1 \quad (28)$$

Since $\Omega_{e_1quad}=0$ when $f_m>f_p$, what one wants is how sensitive is the quadrature error to changes in $f_p$ or $f_m$. First, find the sensitivity to $f_m$ $$\frac{d\Omega_{e_1 quad}}{df_m} = -\frac{\lambda c}{2\Pi LD} \frac{\Pi \epsilon \phi_1}{f_p} \quad (29)$$

for $f_m \approx f_p$.

Plug in some typical numbers. Use a −60 db second harmonic ($\epsilon=10^{-3}$) which is larger than typical.

$$\frac{d\Omega_{e_1 quad}}{df_m} = \frac{1.3 \mu m \; 3 \times 10^8 \text{ m/s}}{2\Pi \; 1.2 \text{ km} \; 2.45"} \left(\frac{180°3600 \text{ s}}{\Pi}\right) \frac{\Pi \; 10^{-3} 1.8}{100 \text{ khz}}$$

$$\frac{d\Omega_{e_1 quad}}{df_m} = -0.01 °/\text{hr/Hz}$$

But experimentally one observes 0.3°/hr/Hz and the second harmonic is typically −70 to −75 dB. Therefore, the "mixing" of the second harmonic with the fundamental cannot explain why square wave modulation produces a high sensitivity of quadrature error to frequency. The answer must be in the higher harmonics.

Now include the third and fourth harmonic. One has for the phase difference modulation from equation 8

$$\Delta\emptyset(t) = z_1 \cos\theta_1 + z_2 \cos\theta_2 + z_3 \cos\theta_3 + z_4 \cos\theta_4 \quad (30)$$

Calculations become rather difficult from here on. Thus, one may use an appropriate mathematical software program to do the rest of the derivations. The terms of cos [$\Delta\emptyset(t)$] that occur at $\omega$ are $$\cos [\Delta\emptyset(t)]_\omega = -2\cos \omega t \{J_0(z_3)J_0(z_4)J_1(z_1)J_1(z_2) + J_0(z_1)J_0(z_4)J_1(z_2)J_1(z_3) + J_0(z_1)J_0(z_2)J_1(z_3)J_1(z_4)\} \quad (31)$$

Now do the same analysis for the fifth and sixth harmonic included $$\Delta\emptyset(t) = z_1\cos\theta_1 + z_2\cos\theta_2 + z_3\cos\theta_3 z_4\cos\theta_4 + z_5\cos\theta_5 + z_6\cos\theta_6 \quad (32)$$

From calculations, one gets $$\cos [\Delta\emptyset(t)]_\omega = -2\cos \omega t \{J_0(z_3)J_0(z_4)J_0(z_5)J_0(z_6)J_1(z_1)J_1(z_2) + J_0(z_4)J_0(z_5)J_0(z_6)J_0(z_1)J_1(z_2)J_1(z_3) + J_0(z_5)J_0(z_6)J_0(z_1)J_0(z_2)J_1(z_3)J_1(z_4) + J_0(z_0)J_0(z_1)J_0(z_2)J_0(z_3)J_1(z_4)J_1(J_5) + J_0(z_1)J_0(z_2)J_0(z_3)J_0(z_4)J_1(z_5)J_1(z_6)\} \quad (33)$$

Next, make the following rough approximations $$J_0(z_n) \sim 1 \text{ for } n=2,3,4,5 \ldots$$

Then equation 33 becomes $$\cos [\Delta\emptyset(t)]_\omega = -2\cos \omega t \{J_1(z_1)J_1(z_2) + J_0(z_1)J_1(z_2)J_1(z_3) + J_0(z_1)J_1(z_3)J_1(z_4) + J_0(z_1)J_1(z_4)J_1(z_5) + J_0(z_1)J_1(z_5)J_1(z_6)\} \quad (34)$$

Now for N harmonics one has $$\cos [\Delta\phi(t)]_\omega = \quad (35)$$

$$-2\cos\omega t \left\{ J_1(z_1)J_1(z_2) + J_0(z_1) \sum_{n=2}^{N} J_1(z_n)J_1(z_{n+1}) \right\}$$

One can write the summation as $$\sum_{n=2}^{N} J_1(z_n)J_1(z_{n+1}) = J_1(z_2)J_1(z_3) + J_1(z_3)J_1(z_4) + \quad (36)$$

$$J_1(z_5)J_1(z_4) + J_1(z_5)J_1(z_6) + \ldots$$

$$= J_1(z_3)[J_1(z_2) + J_1(z_4)] +$$

$$J_1(z_5)[J_1(z_4) + J_1(z_6)] + \ldots$$

$$= \sum_{n=1}^{\frac{1}{2}(N-2)} J_1(z_{2n+1})[J_1(z_{2n}) + J_1(z_{2n+2})]$$

where N is even and gives the number of harmonics in $\Delta\emptyset(t)$. Using equations 36, 35 and 9, one gets for the quadrature error signal $$\|V_{\omega quad}\| = \quad (37)$$

$$-I_0\{J_1(z_2)J_1(z_1) + J_0(z_1) \sum_{n=1}^{\frac{1}{2}(N-2)} J_1(z_{2n+1})[J_1(z_{2n}) + J_1(z_{2n+2})]$$

Now plug in the Zs. Note that the Zs corresponding to the harmonics from 2 and up are small, therefore $$J_1(z_n) \sim z_n/2 \; n = 2,3,4,5 \ldots \quad (38)$$

$$\|V_{\omega quad}\| = -I_0\phi_e \left\{ \sin\left[\Pi \frac{f_m}{f_p}\right] J_1\left(2\phi_1 \sin\left[\frac{\Pi}{2} \frac{f_m}{f_p}\right]\right) \right\} + \quad (39)$$

$$J_0\left(2\phi_1 \sin\left[\frac{\Pi}{2} \frac{f_m}{f_p}\right]\right) \sum_{n=1}^{\frac{1}{2}(N-2)} \phi_{2n+1} \sin\left[\left(n+\frac{1}{2}\right)\Pi \frac{f_m}{f_p}\right] \left(\sin\left[n\Pi \frac{f_m}{f_p}\right] + \sin\left[(n+1)\Pi \frac{f_m}{f_p}\right]\right)$$

To find the sensitivity to changes in $f_m$, one needs to take the derivative. There is only interest in the derivative evaluated at $f_m=f_p$. One knows from experiments that the derivative is constant for small deviations from proper frequency.

$$\frac{d}{df_m} \|U_{quad}\| = -I_0\phi_e \left\{ J_1\left(2\phi_1\sin\left[\frac{\Pi}{2}\frac{f_m}{f_p}\right]\right)\frac{\partial}{\partial f_m}\sin\left[\Pi\frac{f_m}{f_p}\right] + \right.$$

$$\sin\left[\Pi\frac{f_m}{f_p}\right]\frac{\partial}{\partial f_m} J_1\left(2\phi_1\sin\left[\frac{\Pi}{2}\frac{f_m}{f_p}\right]\right) +$$

$$\frac{\partial}{\partial f_m} J_0\left(2\phi_1\sin\left[\frac{\Pi}{2}\frac{f_m}{f_p}\right]\right) \left[\Sigma\phi_{2n+1}\sin\left[\left(n+\frac{1}{2}\right)\Pi\frac{f_m}{f_p}\right]\left(\sin\left[n\Pi\frac{f_m}{f_p}\right] + \right.\right.$$

$$\sin\left[(n+1)\Pi\frac{f_m}{f_p}\right]\right) \bigg] + J_0\left(2\phi_1\sin\left[\frac{\Pi}{2}\frac{f_m}{f_p}\right]\right)\Sigma\phi_{2n+1}\left(\sin\left[n\Pi\frac{f_m}{f_p}\right] + \right.$$

$$\sin\left[(n+1)\Pi\frac{f_m}{f_p}\right]\right)\frac{\partial}{\partial f_m}\sin\left[\left(n+\frac{1}{2}\right)\Pi\frac{f_m}{f_p}\right] +$$

$$J_0\left(2\phi_1\sin\left[\frac{\Pi}{2}\frac{f_m}{f_p}\right]\right)\Sigma\phi_{2n+1}\sin\left[\left(n+\frac{1}{2}\right)\Pi\frac{f_m}{f_p}\right]\left(\frac{\partial}{\partial f_m}\sin\left[n\Pi\frac{f_m}{f_p}\right] + \right.$$

$$\left.\left.\frac{\partial}{\partial f_m}\sin\left[(n+1)\Pi\frac{f_m}{f_p}\right]\right)\right\}$$

(20)

Then evaluate the derivative for $f_m = f_p$.

$$\sin\left[\Pi\frac{f_m}{f_p}\right]\bigg|_{f_m=f_p} = 0$$

$$\sin\left[\frac{\Pi}{2}\frac{f_m}{f_p}\right]\bigg|_{f_m=f_p} = 1$$

$$\sin\left[\left(n+\frac{1}{2}\right)\Pi\frac{f_m}{f_p}\right]\bigg|_{f_m=f_p} = (-1)^n$$

$$\sin\left[n\Pi\frac{f_m}{f_p}\right]\bigg|_{f_m=f_p} = 0$$

$$\sin\left[(n+1)\Pi\frac{f_m}{f_p}\right]\bigg|_{f_m=f_p} = 0$$

$$\frac{\partial}{\partial f_m}\sin\left[\Pi\frac{f_m}{f_p}\right] = -\frac{\Pi}{f_p}$$

$$\frac{\partial}{\partial f_m}\sin\left[\left(n+\frac{1}{2}\right)\Pi\frac{f_m}{f_p}\right] = 0$$

$$\frac{\partial}{\partial f_m}\sin\left[n\Pi\frac{f_m}{f_p}\right] = \frac{n\Pi}{f_p}(-1)^n$$

$$\frac{\partial}{\partial f_m}\sin\left[(n+1)\Pi\frac{f_m}{f_p}\right] = -\frac{(n+1)\Pi}{f_p(-1)^n}$$

$$\frac{d}{df_m}\|U_{quad}\| = I_0\phi_e J_1(2\phi_1)\frac{\Pi}{f_p} - \tag{40}$$

$$I_0\phi_e J_0(2\phi_1)\Sigma(-1)^n\left(\frac{n\Pi}{f_p}(-1)^n - \frac{(n+1)\Pi}{f_p}(-1)^n\right)\phi_{2n+1}$$

$$\frac{d}{df_m}\|U_{quad}\| = I_0\phi_e J_1(2\phi_1)\frac{\Pi}{f_p} + I_0\phi_e J_0(2\phi_1)\frac{\Pi}{f_p}\sum_{n=1}^{\frac{1}{2}(N-2)}\phi_{2n+1} \tag{41}$$

The first term, $$I_0\phi_e J_1(2\phi_1)\frac{\Pi}{f_p},$$

in equation 41 is equal to the proper frequency sensitivity found for bias modulation with a frequency component at the fundamental frequency and at the second harmonic, which is found by taking the derivative of equation 23. The second term, $$I_0\phi_e J_0(2\phi_1)\frac{\Pi}{f_p}\sum_{n=1}^{\frac{1}{2}(N-2)}\phi_{2n+1},$$

which is a series of higher harmonics, shows that the use of more harmonics increases the sensitivity for determining proper frequency.

I claim:

1. A rotation sensor having a sensing coil of optical fiber, and a modulator driven by a signal having a modulation frequency that follows a proper frequency of the sensing coil, comprising:
    a radiation source;
    a coupler connected to said radiation source;
    a splitter connected to said coupler and to said sensing coil;
    a radiation detector connected to said coupler;
    a first phase detector connected to said radiation detector;
    a second phase detector connected to said radiation detector;
    a phase shifter connected to said second phase detector; and
    a modulator driver having a variable frequency control input connected to an output of said second phase detector, and having an output connected to said modulator, to said phase shifter and to said first phase detector; and
wherein:
    said first phase detector is a phase sensitive detector;
    said second phase detector is a quadrature phase sensitive detector;
    said phase shifter is a ninety degree phase shifter;
    the proper frequency is proportional to $c/(nL)$ where n is an index of refraction and L is a length of the optical fiber of said sensing coil, and c is the speed of light in a vacuum; and
    said modulator driver comprises:
        an integrator having an input connected to the output of said second phase detector;
        a voltage controlled oscillator having an input connected to an output of said integrator;
        a divide-by-N non-50/50 duty cycle wave generator having an input connected to an output of said voltage controlled oscillator and having an output connected to said modulator; and a divide-by-N/2 reference generator having an input connected to the output of said voltage controlled oscillator and an output connected to said phase shifter and to said first phase detector; and wherein N is an integer greater than one.

2. The rotation sensor of claim 1 wherein:

said first phase detector comprises:

an inverter; and a pre-accumulator connected to said inverter;

said second phase detector comprises:

an inverter; and a pre-accumulator connected to said inverter;

said phase shifter comprises:

an inverter; and a divide-by-two converter; and said integrator comprises an accumulator.

3. The rotation sensor of claim 2 wherein said divide-by-N non-50/50 duty cycle wave generator comprises:

a counter; and a programmable read only memory having an input connected to an output of said counter and having an output connected to an input of said counter.

4. The rotation sensor of claim 1 wherein said modulator driver comprises:

an oscillator having an output connected to said modulator, to said phase shifter and to said phase detector, and having a frequency control input; and servo electronics having an input connected to the output of said second phase detector and output connected to the frequency control input of said oscillator.

5. A rotation sensor comprising:

a light source for providing a first light beam;

a sensing coil of optical fiber having first and second ends;

a splitter for splitting the first light beam into second and third light beams which enter the first and second ends of said sensing coil, counterpropagate in said sensing coil, develop a phase shift if said sensing coil rotates, and exit second and first ends, respectively, of said sensing coil, and for combining the second and third light beams that exit said sensing coil into a fourth light beam;

a detector for converting the fourth light beam into an electrical signal indicative of phase shift between the second and third light beams;

a modulator for modulating second and third light beams; and a proper frequency tracker for driving said modulator at a proper frequency of said sensing coil, wherein said proper frequency tracker comprises:

an oscillator outputting a clock signal at a frequency that is adjustable according to a voltage signal to said oscillator;

a ninety-degree phase shifter outputting the clock signal of said oscillator, with a ninety-degree phase shift; and a quadrature phase sensitive detector for demodulating the electrical signal indicative of phase shift between the second and third light beams, relative to the clock signal with the ninety degree phase shift, and outputting a signal indicative of an amount of quadrature components in the electrical signal indicative of phase shift between the second and third light beams, the amount of quadrature components being indicative whether said modulator is driven at the proper frequency of said sensing coil;

said proper frequency tracker further comprises an integrator for integrating the signal indicative of an amount of quadrature components in the electrical signal indicative of phase shift between the second and third light beams, into a voltage signal that adjusts the frequency of the clock signal of said oscillator to a multiple of the proper frequency of said sensing coil; and further comprising a modulation signal generator for converting the clock signal of said oscillator into a non-one-half duty cycle signal having a frequency that is a multiple fraction of the frequency of the clock signal of said oscillator, the non-one-half duty cycle signal being an output of said proper frequency tracker for driving said modulator.

6. The rotation sensor of claim 5 further comprising a demodulation signal generator for converting the clock signal from said oscillator to a one-half duty cycle signal having a frequency that is a multiple fraction of the frequency of the clock signal of said oscillator, the one-half duty cycle signal going to said ninety degree phase shifter to be a phase shifted signal that goes to said quadrature phase sensitive detector for demodulating the electrical signal indicative of phase shift between the second and third beams, relative to one-half duty cycle signal.

7. The rotation sensor of claim 6 further comprising a rate phase sensitive detector for demodulating the electrical signal indicative of phase shift between the second and third light beams, relative to the one-half duty cycle signal, into a signal indicative of rate of rotation of said sensing coil.

8. A rotation sensor having a sensing coil of optical fiber, and a modulator driven by a signal having a modulation frequency that follows a proper frequency of the sensing coil, comprising:

a radiation source;

a coupler connected to said radiation source;

a splitter connected to said coupler and to said sensing coil;

a radiation detector connected to said coupler;

a first phase detector connected to said radiation detector;

a second phase detector connected to said radiation detector;

a phase shifter connected to said second phase detector; and a modulator driver having a variable frequency control input connected to an output of said second phase detector, and having an output connected to said modulator, to said phase shifter and to said first phase detector; and wherein:

said first phase detector is a phase sensitive detector;

said second phase detector is a quadrature phase sensitive detector;

said phase shifter is a ninety degree phase shifter;

the proper frequency is proportional to c/(nL) where n is an index of refraction and L is a length of the optical fiber of said sensing coil, and c is the speed of light in a vacuum; and said modulator driver comprises:

an integrator having an input connected to the output of said second phase detector;

a voltage controlled oscillator having an input connected to an output of said integrator;

a non-50/50 duty cycle wave generator having an input connected to an output of said voltage controlled oscillator and having an output connected to said modulator; and a reference generator having an input connected to the output of said voltage controlled oscillator and an output connected to said phase shifter and to said first phase detector.

9. The rotation sensor of claim 8 wherein:

said first phase detector comprises:
   an inverter; and
   a pre-accumulator connected to said inverter;

said second phase detector comprises:
   an inverter; and
   a pre-accumulator connected to said inverter;

said phase shifter comprises:
   an inverter; and
   a divide converter; and said integrator comprises an accumulator.

10. The rotation sensor of claim 9 wherein said non-50/50 duty cycle wave generator comprises:

a counter; and a programmable read only memory having an input connected to an output of said counter and having an output connected to an input of said counter.

11. The rotation sensor of claim 8 wherein said modulator driver comprises:

an oscillator having an output connected to said modulator, to said phase shifter and to said phase detector, and having a frequency control input; and servo electronics having an input connected to the output of said second phase detector and output connected to the frequency control input of said oscillator.

* * * * *